(12) United States Patent
Coleman (10) Patent No.: US 7,133,143 B2
(45) Date of Patent: Nov. 7, 2006

(54) PRINTING METHOD EMPLOYING PRINTER-INDEPENDENT PRINT QUALITY CHARACTERISTICS

(75) Inventor: Robert M. Coleman, Altadena, CA (US)

(73) Assignee: Xerox Corporation, Stamford, CT (US)

( * ) Notice: Subject to any disclaimer, the term of this patent is extended or adjusted under 35 U.S.C. 154(b) by 876 days.

(21) Appl. No.: 10/024,219

(22) Filed: Dec. 21, 2001

(65) Prior Publication Data

US 2003/0121007 A1   Jun. 26, 2003

(51) Int. Cl.
*G06F 15/00* (2006.01)
*G06K 1/00* (2006.01)

(52) U.S. Cl. .................... 358/1.13; 358/1.15
(58) Field of Classification Search ............... 358/1.11, 358/1.13, 1.15, 1.18, 2.1, 1.9, 532, 533; 345/619, 345/621
See application file for complete search history.

(56) References Cited

U.S. PATENT DOCUMENTS

| | | | | |
|---|---|---|---|---|
| 5,579,446 A | | 11/1996 | Naik et al. .................... 395/109 |
| 5,642,474 A | * | 6/1997 | Parkhurst et al. ........... 358/1.18 |
| 5,668,931 A | * | 9/1997 | Dermer ....................... 358/1.4 |
| 5,687,303 A | | 11/1997 | Motamed et al. ........... 395/117 |
| 5,704,021 A | * | 12/1997 | Smith et al. .................. 358/1.9 |
| 6,006,013 A | | 12/1999 | Rumph et al. ............... 395/114 |
| 6,078,403 A | * | 6/2000 | Palmer ....................... 358/1.18 |
| 6,256,104 B1 | | 7/2001 | Rumph et al. ............. 358/1.15 |
| 7,085,000 B1 | * | 8/2006 | Coleman .................... 358/1.15 |
| 2003/0117637 A1 | * | 6/2003 | Coleman .................... 358/1.13 |
| 2003/0117644 A1 | * | 6/2003 | Coleman .................... 358/1.15 |

OTHER PUBLICATIONS

Parkhurst et al., "Connectivity of the HP DeskJet 1200C Printer," Hewlett-Packard Journal, Feb. 1994, pp. 85-97.*
Pending U.S. Appl. No. 10/024,726, Coleman.
Pending U.S. Appl. No. 10/024,727, Coleman.
Pending U.S. Appl. No. 10/023,644, Coleman.

* cited by examiner

*Primary Examiner*—Kimberly Williams
*Assistant Examiner*—Dillon Murphy
(74) *Attorney, Agent, or Firm*—Jeannette Walder

(57) ABSTRACT

A printing system for use in printing objects of any of a plurality of different object types includes a printer; and a printer control device with a user interface having a first option for associating printer-independent print-quality characteristics with a selected object type to be printed by the printer. A printer-independent print-quality characteristic is an instruction associated with an element, such as object type, in an electronic page which indicates printer-independent features that are preferentially emphasized when printing the element. Examples of printer-independent print quality characteristics include "make sharp edges", "reduce mottle", "distinguish neighboring colors", "reduce moiré", "distinguish tone and edges", "maximum tone depth", "perceptual colors" and "compress without loss of detail". The printing system may also include a device for retrieving printer-independent print-quality characteristics associated with a document to be printed by the printer and for associating printer-dependent imaging actions with the printer-independent print-quality characteristics.

10 Claims, 3 Drawing Sheets

PRINTING METHOD EMPLOYING PRINTER-INDEPENDENT PRINT QUALITY CHARACTERISTICS

CROSS-REFERENCE TO RELATED APPLICATIONS

This invention is related to U.S. Pat. No. 5,687,303, Printer Controller for Object Optimized Printing, U.S. Pat. No. 6,006,013, Object Optimized Printing System and Method and U.S. Pat. No. 6,256,104, Object Optimized Printing System and Method, each of which disclosure is incorporated herein by reference and made a part of this application.

FIELD OF THE INVENTION

This invention relates generally to printing systems and, more particularly, to printing systems and methods which provide for the specification and association of print quality characteristics with elements in a document.

BACKGROUND OF THE INVENTION

Prior to the advent of high quality computer-generated page images, page images such as those found in newspapers, newsletters, magazines and the like were formed by graphic artists composing the page images by hand. During the process of combining each different element on a page image, including text, photographs, constant color areas or graphs such as pie charts, and sampled or continuously changing images such as sweeps, the graphic artist could consult with the creators of each of the elements to determine what features of each element were most important to preserve (e.g., "sharp edges", "depth of tone", and so on). Thus the operator was able to optimally form each element on the page, independent of the other elements, by processing each according to the creator's selected features during the combining process.

Because these page images, including one or more of these elements, were composed by hand, each element was inherently treated independently of the others according to the desired features for that element. Thus, the optimal halftone screen design for a particular photograph with a large sky area, which may differ from the optimal halftone screen design for a different photograph with skin tones, could be optimally selected and arranged to an optimal angle according to the imaging processes expressed and carried along with the particular photograph with the large sky area.

With the advent of digital color workstations, copiers and printers, creators of page images who would previously have had to rely on graphic artists to compose and print their page images could instead create, compose, and print them on their own using a computer connected to the digital color copier/printer. However, most digital systems for creating a page image, decomposing the page image into print engine instructions, and controlling the print engine to print the page treated a page image as a single, unitary image. Creators of pages using such digital systems were unable to specify specific processes for rendering the individual page elements. Thus, elements which might have benefited from the use of a halftone screen that emphasized sharp edges, such as a photograph containing many fine lines, were nevertheless treated the same as elements that might have needed to suppress engine noise, such as a large headline color text area where mottle and streaking would be visible within the large letters.

U.S. Pat. No. 5,704,021 to Smith et al., Adaptive Color Rendering By an Inkjet Printer Based on Object Type, describes a method of using a printer system for identifying one or more different types of color objects in a document, selecting a preferred rendering option such as halftoning and/or color matching for each one of such different color object types, respectively, and then printing the document in accordance with the rendering options selected for each of such different color object types. U.S. Pat. No. 5,579,446 to Naik et al., Manual/Automatic User Option for Color Printing of Different Types of Objects, describes an interactive user interface which allows a choice between one "button" automatic control of color output or multi-button control of color output, with both automatic and manual options providing independent control for color halftoning and for color correction based on the types of objects to be printed.

While the foregoing system is an improvement over the single, unitary page system, there are several problems with this user interface. First, this user interface system provides only for selections based on object types, such as "photo", "text", and "other graphics". Using an object's type to decide on image processing actions, in some cases, is simply only a rough approximation. For example, large text may not benefit from the same halftone as small text, because a smooth interior color may be more important for large text than the extremely sharp edges which are crucial to small text. Text above a certain size will have a very visible interior, and may exhibit noticeable quality defects if a compact, edge-sharpening halftone is chosen instead of a coarser halftone that provides robust color transfer and therefore reduces the tiny color deletions known as mottle in the interior. Both cases are text, but two different halftone choices may be called for. As a second example, one scanned photo image may contain fine lines with important edge information while a different scanned image may need large tone depth and smooth color transitions for realistic color. Both are photos, but two different halftones and color maps are needed for optimal printing. It would be desirable to have a system by which rendering can be selected based on more information than simply an object's type.

Second, since this user interface maps object types to printer dependent processes, it requires expert knowledge by the user of the printing response for every printer used and every media desired to be used. Most users are not familiar with the response of each printer to printer-dependent imaging action combinations to effectively improve quality. Deciding the low-level color processing combinations to use to get the best results for each object type demands that users have intimate, expert knowledge of a particular printing system and its responses to all combinations of the low-level color processing choices presented. Even if the user is experienced, the problem is compounded in a networked printer environment, where a file could be sent to any of a number of different color printers. To get optimal quality from all the printers no matter which one is used, a user must now have intimate knowledge of the effect of image processing action combinations on each of the printers on the network.

Third, the user interface system does not take into account the media being used as part of the data deciding what printer imaging actions to take. In addition to being familiar with a printer's image processing actions, an experienced user must also be familiar with how different media are printed on the same printer. The response of any given printer, for example, to both halftone and color map tables varies considerably depending on the media being printed on. For example, the halftone used on smooth, synthetic paper would be optimally different from that used to create the same effect on textured papers or heavy papers. Each media responds differently to the deposition of ink or toner and therefore needs different image processing for optimal results. It would be desirable to have a method which will account both the printer and the media being used as factors in determining printer-dependent imaging actions to take.

SUMMARY OF THE INVENTION

A printing system for use in printing image objects of any of a plurality of different object types, according to one embodiment of the invention, includes a printer and a printer control device with a user interface having a first option for associating printer-independent print-quality characteristics with a selected object type to be printed by the printer. A printer-independent print-quality characteristic is an instruction associated with an image element, such as object type, in an electronic page which indicates printer-independent features that are preferentially emphasized when printing the element. Examples of printer-independent print-quality characteristics include "make sharp edges", "reduce mottle", "distinguish neighboring colors", "reduce moiré", "distinguish tone and edges", "maximum tone depth", "perceptual colors" and "compress without loss of detail". Note that multiple printer-independent print-quality characteristics may be associated with a single image element.

Printer-independent print-quality characteristics guide the imaging compromises made by a printer without specifying exact imaging choices such as the use of a particular halftone, color-matching table, black ink treatment, compression, etc. Thus a printer-independent print-quality characteristic expresses a goal ("sharp edges") for an image element which stays the same from printer to printer, but the specific imaging actions taken to achieve the goal may vary from printer to printer and from media to media depending on the printer/media characteristics.

In accordance with another feature of this embodiment, the user interface may include a second option for associating object descriptors with a selected object type and wherein, responsive to selection of an object descriptor, the second option associates printer-independent print-quality characteristics with the selected object descriptor. Examples of object descriptors include parameters such as type, size, color, location, etc. to allow the user to further refine an image object. Note that multiple printer-independent print-quality characteristics may be associated with a single object descriptor. By mapping an object descriptor (or an object type) to a printer-independent print-quality characteristic, users with no experience in a particular printing system are able to intelligently apply their knowledge of the document to improve the printed document.

In accordance with another feature of this embodiment, the user interface may includes a dialog screen having a first control for invoking an option of automatically associating object descriptors (or object types) with printer-independent print-quality characteristics in accordance with a set of predetermined associations and a second control for manually associating object descriptors (or object types) with printer-independent print-quality characteristics.

Printer-independent print-quality characteristics may also be exploited if the electronic document itself contains the printer-independent print-quality characteristics. Adding the printer-independent print-quality characteristics to the document's PDL file accomplishes this. Furthermore, the identification of objects matching a particular description may sometimes be more accurate when done within a page description language rather than later during the rendering process.

A method of creating a page description language description of an electronic document, according to another embodiment of the invention, includes providing an electronic document, wherein the electronic document includes at least one image object, converting the electronic document into print data and rendering data in accordance with a page description language to generate a PDL file, associating at least one printer-independent print-quality characteristic with the at least one image object, and inserting the association information in the PDL file. In accordance with another feature of the method, printer-independent print-quality characteristics may be associated according to the image object's type and by object descriptor.

Once printer-independent print-quality characteristics have been associated with a document (via the user interface in a printing system or in the PDL file), the printing system needs a way to translate those printer-independent print-quality characteristics to the printer dependent imaging actions. A printing system, according to another embodiment of the invention, includes a printer, and a printer control device for retrieving printer-independent print-quality characteristics associated with a document to be printed by said printer and for associating printer-dependent imaging actions with the printer-independent print-quality characteristics. Upon printing, a data structure would be associated with the electronic document that would include a mapping of printer-independent print-quality characteristics to printer-dependent imaging actions. The printing system would load this mapping over the default mapping it normally uses. This feature of mapping printer-independent print-quality characteristics to actual image processing steps allows virtually complete control over system choices. It may be useful for those expert users with a great deal of experience with a printer, a set of media, and a customer base. It allows the expert user, if desired, to specify printer-dependent imaging actions for new printer-independent print-quality characteristics and also to specify how existing printer-independent print-quality characteristics would be better achieved in the printer's environment. The control may be fine-grained, since each specification for achieving each printer-independent print-quality characteristic would not only be printer specific but also media specific. For example, the halftone set used for the various printer-independent print-quality characteristics on smooth, synthetic paper would be optimally different from those used on textured papers or heavy papers.

A printing system for printing a document having at least one page described in a page description language, according to another embodiment of the invention, includes a printer, a page description language decomposer for converting the document data into at least one image object, a user interface having a first option for associating printer-independent print-quality characteristics with a selected image object to be printed by said printer, and a printer control device for retrieving the printer-independent print-quality characteristics and for associating printer-dependent imaging actions with the printer-independent print-quality characteristics.

DETAILED DESCRIPTION OF THE EMBODIMENTS

Figure 1:
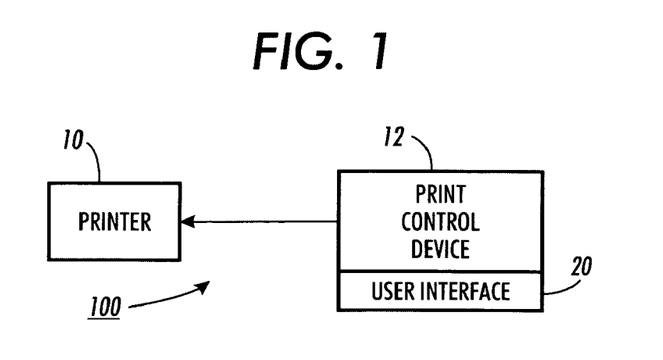
FIG. 1 is a block diagram of a printing system according to one embodiment of the invention.
Figure 2:
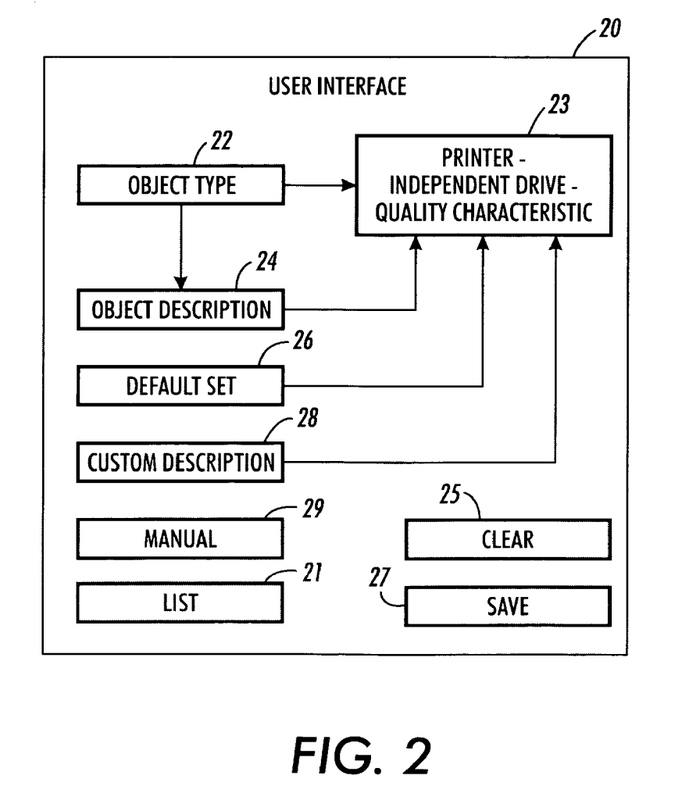
FIG. 2 is a block diagram of the user interface shown in FIG. 1.

A printing system for use in printing image objects of any of a plurality of different object types, according to one embodiment of the invention, is shown in FIG. 1 and referred to by reference numeral 100. Printing system 100 includes a printer 10 and a print control device 12 with a user interface 20. Referring to FIG. 2, user interface 20 includes a first option 22 for associating printer-independent print-quality characteristics 23 with a selected object type to be printed by the printer. A single object type could be associated with one or multiple printer-independent print-quality characteristics.

The user interface associates printer-independent print-quality characteristics with image objects. A printer-independent print-quality characteristic is an instruction associated with a particular image element or elements (such as an image object) on an electronic page. A printer-independent print-quality characteristic can be thought of as a guide indicating an important feature of the element(s) which should be preserved during rendering. Examples of printer-independent print-quality characteristics include "make sharp edges", "reduce mottle", "distinguish neighboring colors", "reduce moiré", "distinguish tone and edges", "maximum tone depth", "perceptual colors", "contour", "no abutting corners", "increase moiré", "uniform gloss", "distinctness" and "compress without loss of detail". Many other printer-independent print-quality characteristics may be defined.

A printer-independent print-quality characteristic is both printer-independent and media-independent. For example, the instruction "make sharp edges" does not say how to make sharp edges on any particular printer or printer/media combination. A printer-independent print-quality characteristic may be used in or associated with an electronic file (or element or object therein) that may be sent to any printer that supports the use of printer-independent print-quality characteristics and printed on any media that is supported by the printer. For example, if the printer-independent print-quality characteristics "sharp edges" is read by a printing system and is associated with a block of small colored text, it indicates that printer-dependent imaging actions (e.g., color transforms, halftones, compression methods, black generation methods, etc.) for that block of small text should be chosen to emphasize the sharpness of edges. Imaging actions are not chosen by the printer-independent print-quality characteristic, because the imaging action choices are specific to a particular printing system, and within a printing system dependent on the media (e.g., paper or transparency) upon which the print will be made. Each printer must make its own specific imaging choices for each of its supported media, guided by the goal of "sharp edges".

A second aspect of the printing system 100 provides for further improvements. For example, small text may need to emphasize "Sharp Edges" while large headline text may need a "Reduce Mottle" printer-independent print-quality characteristics so that the interiors have smooth, solid color. Similarly, a stroke of one width may need different printer-independent print-quality characteristics than a thicker stroke. Some photos may contain sharp edges that should be emphasized, others may need fine-tuned colors. Printing system 100 provides for such a refinement by associating printer-independent print-quality characteristics 23 with object descriptors 24. An object descriptor may include its type, but may also include other parameters which serve to further refine the selection. Elements on the page may thus be described with finer grain than simply the "photo" or "text". Instead, for example, "text below 24 point", "photo at location (x, y)", "photos with only black and white", "color fills with color (r, g, b)" all may be specified as object descriptors.

In many cases, the user may be satisfied with being able to associate printer-independent print-quality characteristics with object types. However, for those cases where finer control is needed, printing system 100 provides the capability to associate printer-independent print-quality characteristics to a set of page elements at a finer level that share similar characteristics. Thus, a user has the option of using associating printer-independent print-quality characteristics with a greater set of object descriptors. The user is also freed from the constraint of having to intimately understand printing and media technology before making intelligent choices for optimum imaging.

Referring again to FIG. 2, the user interface 20 provides a second option for associating object descriptors 24 with printer-independent print-quality characteristics 23. Object descriptors include type, color, size, etc. and provide the user with the option of fine tuning the ultimate rendering by the printer without having to know the specifics of the printer's imaging actions to achieve the printer-independent print-quality characteristic. A single object descriptor could be associated with one or multiple printer-independent print-quality characteristics. Some printers may have a control 26 for invoking an option of automatically associating object descriptors (or object types) with printer-independent print-quality characteristics in accordance with a set of predetermined associations. Control 29 would enable users to override the default set and allow operation of the other controls for manual input. If a user is not satisfied with the available object descriptors, the user may select customer descriptor 28 and define his own object descriptor and associate one or more printer-independent print-quality characteristics with it.

By mapping an object descriptor (e.g., type, size, color, location, etc.) to printer-independent print-quality characteristics, users with absolutely no experience in the particular printing system being used are still able to intelligently apply their knowledge of the document to improve rendering over a printer's default settings. For example, if a black and white scanned image on a page is known by the user (but not the rendering software) to contain important edge information (such as scanned text), a user with no knowledge of the printing system can still apply the "preserve edges" hint to the object descriptor "B/W image" and achieve noticeable improvement.

The user interface 20 can be implemented in software on a network as a window (either in the monitor of an attached computer (not shown) or in the display of the print control device or the printer) which would query the printer driver or other information source of a network printing system to determine which object types are recognized by the system and which parameters can be used as descriptors for each object type, and which printer-independent print-quality characteristics are supported. The user interface may then display a layered window containing the queried information or all items could be displayed in a single window as shown in FIG. 2. For example, an automatic mode might be set by selecting default set 26. For manual input, a user would select manual 29 and then begin selecting according to object type 22 or object descriptor 24. If the user changes any settings, the user can save the settings by selecting save 27 and those settings will be used instead of the default settings of automatic mode. To start over the user may select clear 25. To load a previously saved group of settings, the user may select load 21 and then select from a list of previously saved named settings.

If the user selects object type 22, a list of recognized object types is displayed to the user. Examples of object types include text, graphics and photo, but any number of other object types might also be used. To associate printer-independent print-quality characteristics with an object descriptor, the user may select object descriptor 24 and a list of object descriptors would be displayed. Alternatively, the user may select a particular object type, for example "text" using object type 22 and then select from a list of displayed object descriptors associated with that object type (for example "size", since text of different sizes should often be mapped to different printer-independent print-quality characteristics). Available printer-independent print-quality characteristics may be displayed by printer-independent print-quality characteristics 23, from which the user may select one or more to associate with the particular object descriptor associated with the object type text.

A printing system that uses printer-independent print-quality characteristics to guide printer-dependent imaging actions (described below) will then provide an automatic mapping, with manual intervention as necessary, to map the printer-independent print-quality characteristics to a specific set of imaging actions (color transforms, halftones, compression methods, black generation methods, etc.) which will be taken to implement that printer-independent print-quality characteristic. This mapping may also take into account the media or media-type that is being requested for printing the document.

The printing system 100 allows users to select from a large and extensible list of object types, and to attach to each of those object types not low-level rendering choices such as choice of halftone, but rather high-level descriptions of important features for each object type. For example, rather than choosing a "Scatter Halftone" for text objects (the default printer-dependent imaging action choice in many printers), a user might choose the printer-independent print-quality characteristic "Sharp Edges" (which may be the default choice for text objects). Being able to associate a printer-independent print-quality characteristic with an object type or object descriptor provides greater control and flexibility than mapping to a printer-dependent imaging action such as "Scatter Halftone" for text. Selecting "Scatter Halftone" for text requires an intimate knowledge of the effects of various halftones for each particular printer and media. With the printing system 100, no knowledge of printing systems, halftones, color, media, or imaging is needed. All that is needed is for the user to state that he wants certain text to have "Sharp Edges", no matter which printer or which media is being used. It is up to each printer to implement the "Sharp Edges" command with the appropriate set of printer-dependent imaging actions for the media being used.

The user interface 20 may be implemented as a computer software program run on a personal computer coupled with printing system 100. User interface 20 may, for example, be implemented as a tool within any of a number of standard and well-known printer dialog windows. Upon being selected, the tool queries the associated printing system to determine 1) which object types are recognized by the system, 2) which parameters if any can be used as descriptors for each object type, and 3) which printer-independent print-quality characteristics are supported. The user interface tool may then display a layered window containing the queried information. At the top layer, a list of recognized object types may be presented to the user. The tool program may be configured such that right-clicking an object type brings up a window allowing finer-grained object descriptors (for example, right-clicking the "text" object type might provide an optional descriptor window that could include "size", "color", "location", etc.). The descriptor window for each object allows user input, for example, to specify that text of different sizes or different colors be mapped to a different set of printer-independent print-quality characteristics.

In the next step, once a user has described a particular object by at least type and possibly other parameters, the user may map that object descriptor to a particular set of printer-independent print-quality characteristics. This may be accomplished by clicking on the object descriptor to bring up a sub-window of available printer-independent print-quality characteristics, with the ones currently selected marked and listed in order of precedence. Initially, this list may be the default list provided by the factory with the printing system. The user may build a new list of printer-independent print-quality characteristics for that particular object descriptor by clicking on the desired printer-independent print-quality characteristics to select or de-select them, and click-dragging each to place it in desired order.

Alternatively, a user interface software tool may be located within a document creation system where no printer has yet been chosen to query for available object types, object descriptors, and printer-independent print-quality characteristics. In this case, it is possible that a standardized list of object types, object descriptors, and printer-independent print-quality characteristics will eventually be agreed upon to be recognized by a wide range of printers. In this embodiment, a standardized list of object types, descriptors, and printer-independent print-quality characteristics is presented to the user, and the mapping of printer-independent print-quality characteristics to described objects proceeds as described above.

Note that while in the first exemplary case an actual printing system is queried before presenting lists to a user, in neither case is the user required to enter information that depends on knowledge of the printing system or the media to be used. Note too that the querying process of the first software embodiment provides for an extensible and flexible list of object types, allowed object descriptors, and supported printer-independent print-quality characteristics, dependent only on the sophistication of the printing system.

Both embodiments may include a Save button so that once all desired changes have been made, the user may optionally save the changes with a unique name. A Load button may similarly list previously saved object descriptor or object type to printer-independent print-quality characteristics mappings from which the user may choose. One mapping usually on the list is a default mapping which came with the system, so that a user may easily restore a system to its default settings.

Upon printing, a data structure giving the mappings of object descriptors to printer-independent print-quality characteristics is loaded into the printing system at any of a number of possible locations or attached to the print data sent. Upon receipt the front end RIP of the printing system replaces the default mapping it normally uses with this new mapping before beginning the rendering process.

A page description language (PDL) is a language such as Adobe Systems, Inc.'s PostScript™ or Xerox's InterPress which allows the appearance of a printed page to be described in a high-level, device-independent way. PostScript™ (PS) is a page description language defined and copyrighted by Adobe Systems. Printing then becomes a two-stage process: an application program produces a description in the language, which is then interpreted by a specific output device. Such a language can therefore serve as an interchange standard for transmission and storage of printable documents.

In another embodiment of the invention, printer-independent print-quality characteristics can be inserted into the page description language of an electronic document. This is accomplished by providing an electronic document, wherein the electronic document includes at least one image object, converting the electronic document into print data and rendering data in accordance with a page description language to generate a PDL file, associating at least one printer-independent print-quality characteristic with the at least one image object, and inserting the association information in the PDL file.

Thus a page description language file may include printer-independent print-quality characteristics (such as "make sharp edges", "reduce mottle", "neighboring colors must be distinguishable", "reduce moiré", "distinguish tone and edges" and "compress without loss of detail") associated with the various image objects in the document. After the PDL file is generated, it may be sent to any printing system which is able to use the included printer-independent print-quality characteristics or object information to guide and optimize the processing of the various elements within the PDL file for optimal storage and printing.

A printing system that uses printer-independent print-quality characteristics to guide imaging actions will then provide an automatic mapping, with manual intervention as necessary, to map the printer-independent print-quality characteristics to a specific set of printer-dependent imaging actions (such as, color transforms, halftones, compression methods, black generation methods, etc.) which will be taken by that particular printer to implement the particular printer-independent print-quality characteristics. This mapping may also take into account the media or media-type that is being requested for printing the document.

In a first aspect of this embodiment, the method provides for the modification of a page description language version of a electronic document by inserting information corresponding to a mapping of image objects (such as object types) to printer-independent print-quality characteristics into the PDL file representing the electronic document. The page description language file is modified to become a self-contained source of information, for any printing system which is able to interpret and use it, regarding the important features to preserve for each of an extensible list of object types. Printer-independent print-quality characteristics associated with image objects are added to an electronic file which can be sent anywhere, at any time, without re-specifying for each printer and media. Further, the user needs no knowledge of printing systems, halftones, color, media, or imaging. All that is needed is for the user to state that he wants object type "text" to have "Sharp Edges", no matter which printer and which media is being used. It is up to each printer to implement the "Sharp Edges" command found embedded in the page description language file with the appropriate set of printer-dependent imaging actions for the media being used.

The PDL file may be generated with further refinements. As noted above, small text may need to emphasize "Sharp Edges" while large headline text may need a "Reduce Mottle" printer-independent print-quality characteristic so that the interiors have smooth, solid color. Similarly, a stroke of one width may need different printer-independent print-quality characteristics than a thicker stroke. Some photos may contain sharp edges that should be emphasized, others may need fine-tuned colors. This desired refinement may be achieved by inserting information into a page description language associating printer-independent print-quality characteristics with object descriptors, not simply object types. An object descriptor may include its type, but may also include other parameters which serve to further refine the selection. The method provides users with the capability to add to a page description language information that associates printer-independent print-quality characteristics to a set of image objects in a page that share similar characteristics.

In a further aspect of this embodiment, the method enables a user to modify a page description language file by inserting object descriptor comments which can later help a rendering system to accurately identify page elements which match a particular object descriptor. The system may implement this feature by recognizing "boilerplate" or common PDL constructs from major page creation applications as representing the way a particular object is rendered in a PDL by a particular page creation application. This aspect of the invention may serve to improve the accuracy by which objects are recognized by the imaging software. Such recognition is important so as to accurately apply printer-independent print-quality characteristics to the correct objects. For example, in many PostScript documents, color "sweeps" (areas of color that gradually and smoothly change from one color to another) are often implemented as thin strokes of color set side by side, with each stroke having a slightly different color. In the page description language, such "boilerplate" constructs can be more easily identified as a color sweep; later in the process, however, the imaging code may simply see a series of strokes, and misapply the printer-independent print-quality characteristics for strokes. This may serve to emphasize edges when actually the user desires to emphasize smooth color transitions with no visible edges. By adding object information and comments into the PDL file for the electronic document, an imaging system which can use such commented information can thereby correctly identify a complex object type.

In accordance with another aspect of this embodiment, instead of inserting an overall mapping of object type or object descriptors to printer-independent print-quality characteristics into the page description language file, it may be more convenient in some cases to identify object types throughout the electronic document by location, and insert the appropriate printer-independent print-quality characteristic instructions at the appropriate places throughout the document. This structure allows an imaging system to skip the step of building a mapping table of objects to printer-independent print-quality characteristics, and simply rely on the page description language to provide the appropriate printer-independent print-quality characteristics at the appropriate times. This aspect may also be implemented in a page creation software program which allows the addition of printer-independent print-quality characteristics to individual elements on a page.

This embodiment of the invention may be implemented by using Document Structuring Convention (DSC) comments to implement the addition of object to printer-independent print-quality characteristics mapping tables into a PostScript page description language. The DSC is a well-known and recognized system for providing additional information to a page rendering system that goes beyond explicitly defined PostScript. As such, it is a convenient vehicle for carrying a table of information providing a desired mapping between objects and printer-independent print-quality characteristics. Such a table can be used to advantage by a printing system which is able to read, interpret, and use printer-independent print-quality characteristics for optimal rendering, yet will be safely ignored as mere comments by printing systems which do not implement printer-independent print-quality characteristics. DSC comments are normally read by a pre-processing system, which is then able to set up an environment for an imaging system to use while it is reading and executing the PostScript proper. Thus, for a printing system which implements printer-independent print-quality characteristics, a pre-processor would read the table from the DSC comments and construct a table that matches the imaging system's data structure and contains the mapping information for each page of the document.

Not all systems can use the DSC comments provided in PostScript. For systems which cannot, this embodiment of the invention can be implemented by using normal imaging commands, but with a special code that denotes to "listening" software that special information is forthcoming, but which causes no harm to software that is not prepared to handle object type or printer-independent print-quality characteristics information from the PostScript data stream. An example is to use the "moveto" command to move to a predesignated location well off the imagable area of a page (for example, an ($X_{min}$, $Y_{min}$) coordinate would likely be off any realistic imagable page), and then use the PostScript "show" command to indicate a text string that actually contains object or printer-independent print-quality characteristics information. The routine that handles "moveto" in the system imager is modified to identify the predesignated ($X_{min}$, $Y_{min}$) coordinates, and sets a flag. The "show" procedure of the imager is modified to consult the flag, and, if set, to interpret the string not as text to be shown but as object or printer-independent print-quality characteristics information to be stored at the appropriate location. Any imaging system not so modified would simply image a text string off the page (a relatively quick process), and the page image itself would not be changed.

Other systems for describing a page, using Page Description Languages (PDLs) such as Interpress™, Graphical Display Interfaces (GDIs), such as the one used with Windows™, Printer Command Languages (PCLs) for controlling a print engine, such as the Hewlett-Packard Printer Command Language (PCL-5)™, or the like, have similar structures which would yield to including special information about object types and printer-independent print-quality characteristics.

This embodiment of the invention allows the user to add into a page description language a mapping of object types to printer-independent print quality characteristics instead of printer/media dependent combinations of specific rendering choices, frees the user from needing any knowledge of the printing system or media desired to be used, and allows the user to generate printer-independent page description language files that still contain valuable additional information to guide optimal rendering. This embodiment also allows a user to go beyond limiting image objects to object types (users can specify object descriptors and insert comments), gives much more fine-grained control to the user to define the elements within a page that are of interest for optimized printing, and to add that printer-independent print-quality characteristic information into a PDL. This embodiment also provides an alternative method by which the object and printer-independent print-quality characteristic information is loaded into a PDL file, allowing a diversity of ways in which imaging systems can implement the use of printer-independent print-quality characteristics to optimize document storage and printing.

Figure 3:
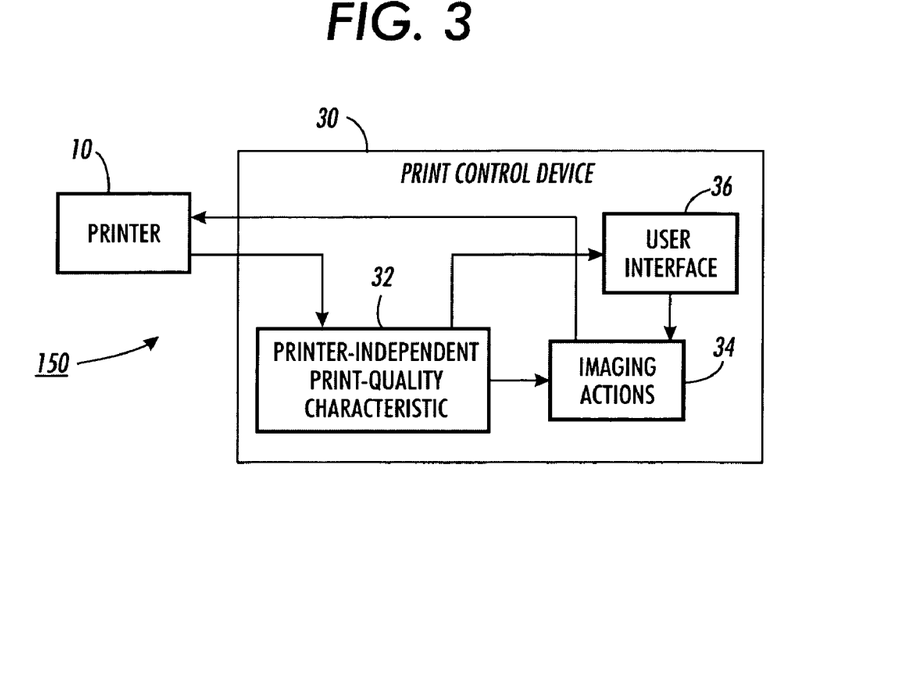
FIG. 3 is a block diagram of a printing system according to another embodiment of the invention.

A printing system according to another embodiment of the invention is shown in FIG. 3, and referred to by reference numeral 150. Printing system 150 includes a printer 10 and a printer control device 30. Printer control device 30 retrieves printer-independent print-quality characteristics 32 associated with a document to be printed by printer 10 and associates printer-dependent imaging actions 34 with the printer-independent print-quality characteristics 32. Printer control device 30 also includes a user interface 36 having a control for associating printer-independent print-quality characteristics with printer-dependent imaging actions. In most cases, the printer control device would have a predetermined set of mappings of imaging actions for each printer-independent print-quality characteristic. However, when a user desires to change that mapping for a particular print job, the user interface allows the user to make changes to the mappings. The user interface would in most cases only be used by sophisticated users, but is available to all users.

Figure 5:
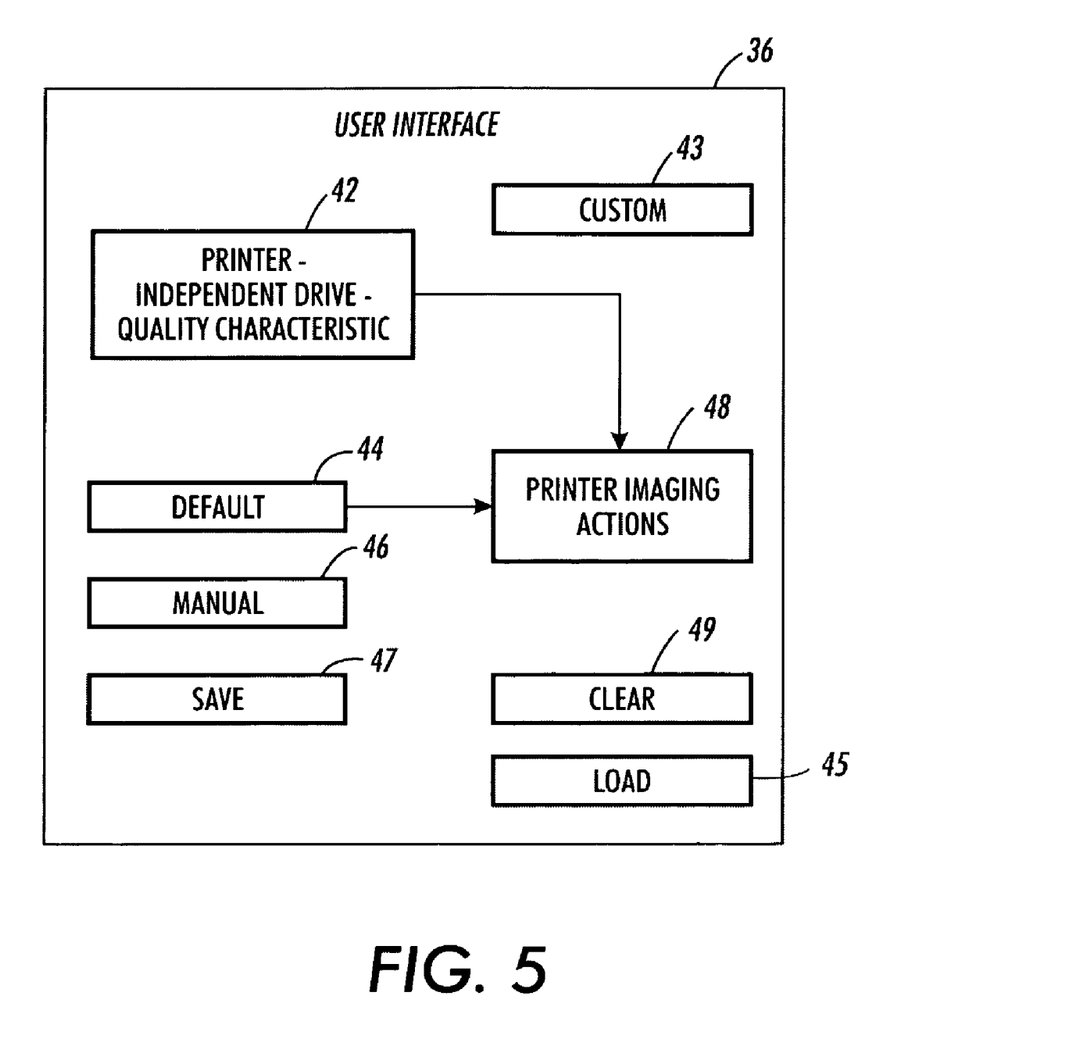
FIG. 5 is a block diagram of the user interface shown in FIG. 3.

Referring to FIG. 5, user interface 36 includes control 44 for automatically associating printer-independent print-quality characteristics 42 with printer-dependent imaging actions 48 in accordance with a set of predetermined default associations and control 46 for enabling the user to manually associate printer-independent print-quality characteristics 42 with printer-dependent imaging actions 48. Control 47 allows the user to save his selections and control 49 allows the user to clear work and start over. Load control 45 allows a user to load a previously saved set of selections. Control 43 allows a user to define a new printer-independent print-quality characteristic which the user can then associate printer-dependent imaging actions. Control 43 allows unlimited expansion of custom printer-independent print-quality characteristics, by providing a mechanism for mapping new printer-independent print-quality characteristic names to image processing steps.

A color or black and white printing system can respond to printer-independent print-quality characteristics associated with particular elements within a page to guide the processing of those elements. Printer-independent print-quality characteristics are user-extensible and are associated with elements within a document. They are mapped to printer-and-media-dependent imaging actions (such as choice of halftone, color correction, black treatment, trapping boundary conditions, compression, etc), with the result that different elements within a page are processed differently as guided by the provided printer-independent print-quality characteristics. For example, colored text above a certain point size might be processed with a very smooth halftone to reduce the extent of mottle in the interior of the text. A photograph containing text or lines might be processed to preserve the sharp edges within the photograph. A different photograph with a large sky area might be processed to reduce the visibility of the cyan halftone dot which is so present in the sky. A default list of element descriptions and the associated desired rendering is provided. Mappings are derived either from factory supplied or user-supplied values, and may be named, stored, and reused.

System 150 provides a method and system by which the printer-independent print-quality characteristics are used to switch imaging actions within a page to produce an optimally printed page. For each registered media, each printer-independent print-quality characteristic is automatically mapped to an extensible list of printer-and-media-dependent imaging actions (choice of halftone, color correction, black treatment, trapping boundary conditions, compression, etc.). For example, each printer for each media will map the printer-independent print-quality characteristic "sharp edges" to the set of imaging actions that best advance the goal of creating sharp edges. System 150 also provides for user control, however, in that it provides an output user interface 36 which allows a user to change the mapping of any printer-independent print-quality characteristic to a different list of imaging actions. User interface 36 also allows a user to define a new printer-independent print-quality characteristic by linking it to a list of imaging actions. System 150 applies, at the correct point in the imaging chain, all imaging actions as specified to produce a page optimized according to the printer-independent print-quality characteristics of the page creator.

User interface 36 can be implemented in any of the ways user interface 20 was described as being implemented. For example, user interface 36 can be implemented as a window which would query the printer driver or other information source of a network printing system to determine the printer processing steps (halftone, color transform, etc.) which are available to be switched in that particular printing system, the available choices for each (e.g., which halftones are available, which color transforms, etc.), the printer-independent print-quality characteristics currently supported, the media types currently supported, and the current default mappings of printer-independent print-quality characteristics to color processing steps for each supported media type.

The user interface could then display a layered window containing the queried information. The first list presented to the user is the list of supported printer-independent print-quality characteristics. At that layer the user is able to add custom printer-independent print-quality characteristics to be mapped later by the user to particular image processing steps. If a user selects any of the printer-independent print-quality characteristics, a sub-window may be displayed which shows the color processing steps taken, for each supported media, for that printer-independent print-quality characteristic. If the user selects any of those color processing steps (e.g., the halftone used), a further sub-window is displayed listing the halftone choices, and the user may choose a different one.

In customizing a new printer-independent print-quality characteristic, the user may be initially supplied with generic color processing choices for each supported media (the ones the system would use if no printer-independent print-quality characteristics are available for an image object). The user may, as outlined above, select each of the generic color processing steps, be provided with a list of all available options, and may select one of those options. When finished, the new custom printer-independent print-quality characteristic will have been defined for whatever media the user wishes to define.

Upon printing, a data structure giving the mappings of printer-independent print-quality characteristics to color processing steps would be attached to the print data sent, and the imaging system would have to be prepared to load this mapping over the default mapping it normally uses. These requirements could be implemented any number of ways.

Figure 4:
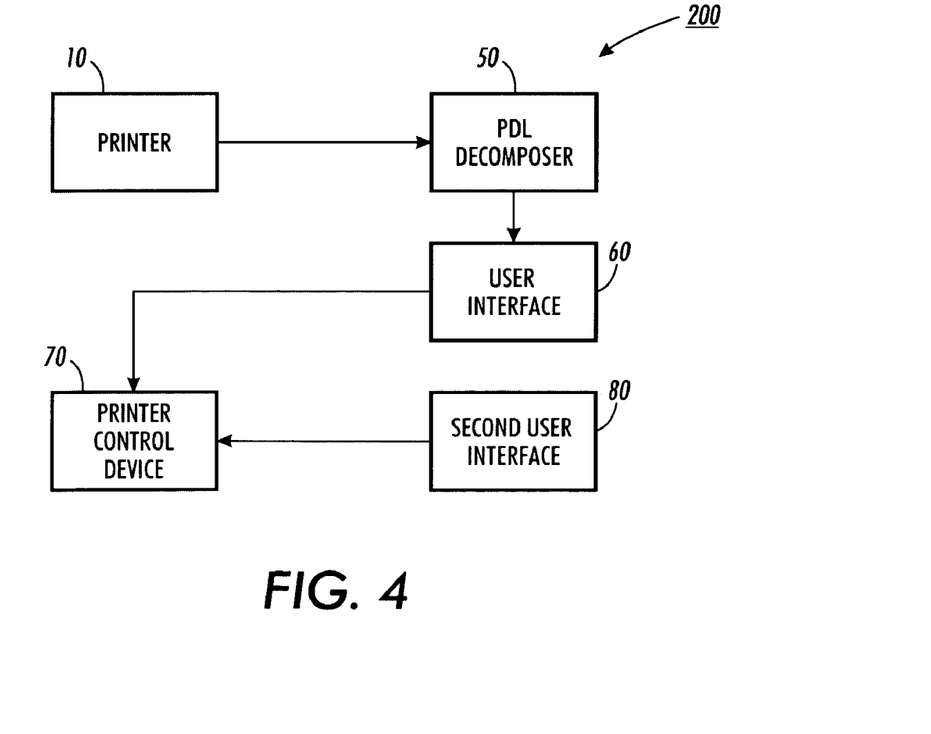
FIG. 4 is a block diagram of a printing system according to yet another embodiment of the invention.

A printing system for printing a document having at least one page described in a page description language, according to another embodiment of the invention, is shown in FIG. 4 and referred to by reference numeral 200. System 200 includes a printer 10, a page description language decomposer 50 for converting the document data into at least one image object, a user interface 60 having a first option for associating printer-independent print-quality characteristics with a selected image object to be printed by said printer, and a printer control device 70 for retrieving the printer-independent print-quality characteristics and for associating printer-dependent imaging actions with the printer-independent print-quality characteristics. An optional second user interface 80 (the features of which may be incorporated in user interface 60 to provide a combined user interface having all features) includes a control for associating printer-independent print-quality characteristics with printer-dependent imaging actions.

System 200 recognizes and is able to process printer-independent print-quality characteristics. System 200 enables users to obtain and view the list of printer-independent print-quality characteristics currently understood and supported by the printer, a list by category of possible imaging actions, and a list of media used by the printer. System 200 allows users to specify printer-independent print-quality characteristics for particular image objects in a document to be printed if no prior application has assigned any to the document and to change printer-independent print-quality characteristics already assigned to the document. Additionally, system 200 provides a method of changing, for any of the registered media, any of the current mappings of printer-independent print-quality characteristics to printer-dependent imaging actions. All user actions may be optionally saved and stored. System default settings may be restored.

Custom printer-independent print-quality characteristics may be defined by the user and mapped to both image objects and printer-dependent imaging actions. The user may be initially supplied with generic imaging actions for each supported media (the ones the system would use if no printer-independent print-quality characteristics are available for an image object). The user may, as outlined above, select each of the generic imaging actions, be provided with a list of all available options, and may select one of those options. When finished, the new custom printer-independent print-quality characteristic will have been defined for whatever media the user wishes to define.

Upon printing, a data structure giving the mappings of printer-independent print-quality characteristics to imaging actions is loaded into the printing system at any of a number of possible locations or attached to the print data sent, and the front end RIP of the printing system replaces the default mapping it normally uses with this new mapping before beginning the rendering process.

By using printer-independent print-quality characteristics to primarily guide the imaging actions taken for processing individual elements of an electronic page for printing or display, it is possible to respond to the page creator's desires more accurately. By using printer-independent print-quality characteristics (which are both printer-independent and media-independent), it is possible to generate electronic pages that may be printed reliably on any printer and any media while maintaining the optimum output according to the page creator's desires. By including media type as a factor in deciding on printer-specific imaging actions, a much greater degree of control is offered to the user to achieve optimum output. By allowing image objects to be identified not only by an extensible list of object types but also an extensible set of object descriptors, a finer-grained set of elements may be identified for optimized processing. By allowing a large and extensible range of possible imaging actions (halftone, black generation, tone curve, color space transform, gamut mapping, compression, etc.), greater control is given to more effectively optimize a printer-independent print-quality characteristic for a particular printer/media. By allowing the current mapping of printer-independent print-quality characteristics to imaging actions (starting with the factory default mapping) to be changed in part or in whole, a user is able to tune a particular printer printing on a particular media for a particular market to achieve the designer's printer-independent print-quality characteristics as closely as possible. By providing for naming, storing, and restoring of printer-independent print-quality characteristic mappings, users are able to efficiently switch between default and multiple custom settings for testing purposes or to allow for personal preferences from various users.

The printing systems and methods described herein can readily be used in combination with the object optimized printing systems and methods described in U.S. Pat. Nos. 5,687,303, 6,006,013, and 6,256,104.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method of creating a page description language description of an electronic document; comprising:
    providing an electronic document, wherein the electronic document includes at least one image object;
    converting the electronic document into print data and rendering data in accordance with a page description language to generate a PDL file;
    associating at least one printer-independent print-quality characteristic with the at least one image object;
    wherein a printer-independent print-quality characteristic comprises instructions for indicating a feature of an image element that is to be preserved during rendering without specifying any printer-specific imaging actions needed to achieve the feature, such that when printer-dependent imaging actions are associated with the printer-independent print-quality characteristic, the printer-dependent imaging actions taken by the printer achieve the feature of the image element to be preserved during rendering; and
    inserting the association information in the PDL file.

2. The method of claim 1, wherein the image object has an object type and wherein the associating step comprises the steps of:
    providing a list of object types;
    providing a list of printer-independent print-quality characteristics;
    selecting the image object's object type from the list of object types; and
    associating at least one printer-independent print-quality characteristic with the selected object type.

3. The method of claim 1, wherein the associating step comprises the steps of:
    providing a list of object descriptors for the image object; and
    associating at least one printer-independent print-quality characteristics with each of said object descriptors.

4. The method of claim 3, further comprising:
    defining a custom object descriptor for the image object;
    adding the custom object descriptor to the list of object descriptors; and
    associating at least one printer-independent print-quality characteristics with said custom object descriptor.

5. The method of claim 1, further comprising providing a default set of associations for use by the page description language, wherein the default set comprises a plurality of object types and at least one printer-independent print-quality characteristic associated with each of said plurality of object types; and
    inserting the default set in the PDL file.

6. The method of claim 3, further comprising:
    inserting the list of object descriptors for the image object in the PDL file.

7. The method of claim 1, further comprising:
    identifying locations of the at least one image object in the document; and
    inserting the printer-independent print quality-characteristic at the identified location with the image object.

8. The method of claim 3, further comprising adding PDL language comments for each object descriptor.

9. The method of claim 1, further comprising inserting the association information in the PDL file by location of the particular image object.

10. The method of claim 1, wherein the printer-independent print-quality characteristics comprise at least one of "make sharp edges", "reduce mottle", "distinguish neighboring colors", "reduce moiré", "distinguish tone and edges", "maximum tone depth", "perceptual colors", "contour", "no abutting corners", "increase moiré", "uniform gloss", "distinctness" and "compress without loss of detail".

* * * * *